United States Patent
Nagatsuka et al.

(10) Patent No.: US 9,643,323 B2
(45) Date of Patent: May 9, 2017

(54) ROBOT HAND

(71) Applicant: THK CO., LTD., Shinagawa-ku, Tokyo (JP)

(72) Inventors: Masaki Nagatsuka, Tokyo (JP); Yoshimasa Endo, Tokyo (JP)

(73) Assignee: THK CO., LTD., Tokyo (JP)

( * ) Notice: Subject to any disclaimer, the term of this patent is extended or adjusted under 35 U.S.C. 154(b) by 57 days.

(21) Appl. No.: 14/442,202

(22) PCT Filed: Aug. 28, 2013

(86) PCT No.: PCT/JP2013/072998
§ 371 (c)(1),
(2) Date: May 12, 2015

(87) PCT Pub. No.: WO2014/077018
PCT Pub. Date: May 22, 2014

(65) Prior Publication Data
US 2016/0263748 A1 Sep. 15, 2016

(30) Foreign Application Priority Data

Nov. 14, 2012 (JP) .................................. 2012-250491

(51) Int. Cl.
*B25J 15/08* (2006.01)
*B25J 15/00* (2006.01)
*B25J 15/10* (2006.01)

(52) U.S. Cl.
CPC .......... *B25J 15/0009* (2013.01); *B25J 15/10* (2013.01)

(58) Field of Classification Search
CPC ........ B25J 15/0009; B25J 15/08; B25J 15/10; Y10S 901/37; Y10S 901/38; Y10S 901/39

(Continued)

(56) References Cited

U.S. PATENT DOCUMENTS 4,834,443 A * 5/1989 Crowder ................. A61F 2/583
  294/106
6,244,644 B1 * 6/2001 Lovchik ................... B25J 9/104
  294/111

(Continued)

FOREIGN PATENT DOCUMENTS

JP  2002-113681 A  4/2002
JP  2005-169602 A  6/2005

(Continued)

OTHER PUBLICATIONS

Official Communication dated Nov. 16, 2015, issued in counterpart German application No. 112013005465.5, with English translation. (9 pages).

(Continued)

*Primary Examiner* — Dean Kramer
(74) *Attorney, Agent, or Firm* — Westerman, Hattori, Daniels & Adrian, LLP

(57) ABSTRACT

Provided is a robot hand that is capable of gripping an object and manipulating the gripped object in a manner similar to that of a human hand, and that makes it possible to reduce the number of actuators. This robot hand is provided with: a first actuator (31) that imparts driving force to a first finger link (11) so that the first finger link (11) pivots relative to a base section (1); and a second actuator (32) that imparts driving force to at least one of a second finger link (12) and a third finger link (13) so that the second finger link (12) pivots relative to the first finger link (11) and the third finger link (13) pivots relative to the second finger link (12).

8 Claims, 6 Drawing Sheets

(58) Field of Classification Search
USPC .................................................. 294/106, 198
See application file for complete search history.

(56) References Cited

U.S. PATENT DOCUMENTS

| | | | |
|---|---|---|---|
| 6,817,641 B1 | 11/2004 | Singleton, Jr. | |
| 8,052,185 B2* | 11/2011 | Madhani | B25J 15/0009 294/106 |
| 2008/0127768 A1 | 6/2008 | Shirai et al. | |
| 2011/0068595 A1* | 3/2011 | Ihrke | B25J 9/104 294/106 |
| 2011/0241369 A1* | 10/2011 | Kamon | B25J 9/102 294/213 |

FOREIGN PATENT DOCUMENTS

| | | |
|---|---|---|
| JP | 2009-233790 A | 10/2009 |
| JP | 2011-104752 A | 6/2011 |
| KR | 20100112670 A | 10/2010 |
| KR | 20120013560 A | 2/2012 |
| WO | 2006/054443 A1 | 5/2006 |

OTHER PUBLICATIONS

Notification of Reasons for Refusal issued in counterpart Korean Patent Application No. 10-2015-7015412 dated Sep. 14, 2015, with English translation. (11 pages).
International Search Report dated Oct. 1, 2013, issued in corresponding application No. PCT/JP2013/072998.

* cited by examiner

ROBOT HAND

TECHNICAL FIELD

The present invention relates to a robot hand having multiple joints, and being capable of gripping an object and manipulating the gripped object like a human finger.

BACKGROUND ART

As a robot hand having multiple joints like a human finger, there is known a robot hand that includes a base section corresponding to the back of a human hand, a first finger link corresponding to a proximal phalange of a finger, a second finger link corresponding to an intermediate phalange of a finger, and a third finger link corresponding to a distal phalange of a finger. The first finger link is pivotably connected to the base section. The second finger link is pivotably connected to the first finger link. The third finger link is pivotably connected to the second finger link.

When a robot hand grips an object, the object is wound by the finger. To wind the object with a finger, the first finger link, the second finger link and the third finger link are configured to be sequentially bent. As a typical robot hand, there is known a robot hand which is configured such that a second finger link is bent interlocking with a first finger link when the first finger link is bent, and a third finger link is bent interlocking with the second finger link when the second finger link is bent. A driving source for bending the finger is a motor or an actuator, such as a linear actuator. The driving source imparts driving force to the first finger link so that the first finger link is bent relative to the base section. When the first finger link is bent, the second finger link and the third finger link are sequentially bent.

A typical robot hand of conventional art is able to stably "grip" an object, however, suffers from a problem of difficulty in "manipulating" the object. To "grip" refers to that an object is firmly held, while to "manipulate" refers to that a machine, for example, is manipulated to bring it into action. For example, when a robot is assigned to a screw tightening job using an electric screwdriver, the robot hand is required to firmly hold (grip) the handle of the electric screwdriver and pull (manipulate) the trigger of the electric screwdriver. A typical robot hand of conventional art excels in firmly holding the handle of an electric screwdriver, however, suffers from a problem of not being good with pulling the trigger of the electric screwdriver.

As a robot hand that solves the problem, the applicant has proposed a robot hand having a finger in which a small actuator is incorporated into each joint of the finger (see Patent Literature 1). In this robot hand, a first actuator is incorporated into a first joint between a base section and a first finger link. A second actuator is incorporated into a second joint between the first finger link and a second finger link. A third actuator is incorporated into a third joint between the second finger link and a third finger link. The robot hand described in Patent Literature 1 is able to independently bend the first to third finger links, and hence is able to grip an object and manipulate the gripped object.

CITATION LIST

Patent Literature

Patent Literature 1: JP 2002-113681 A

SUMMARY OF THE INVENTION

Technical Problem

However, the robot hand described in Patent Literature 1 suffers from a problem of difficulty in obtaining a fingertip force (torque) and a bending angle of a finger (stroke) similar to those of a human being, with an actuator of a size that can be housed in each joint of the finger. Further, since an actuator is provided to each joint, there is a problem of increasing the number of actuators.

In this regard, the present invention has an object of providing a robot hand which is capable of gripping an object and manipulating the gripped object like a human hand, and can reduce the number of actuators.

Solution to Problem

In order to solve the above problem, the present invention provides a robot hand that includes: abase section; a first finger link pivotably connected to the base section; a second finger link pivotably connected to the first finger link; a third finger link pivotably connected to the second finger link; an auxiliary link that interlocks pivoting of the second finger link relative to the first finger link with pivoting of the third finger link relative to the second finger link; a first actuator that imparts driving force to the first finger link so that the first finger link pivots relative to the base section; and a second actuator that imparts driving force to at least one of the second finger link and the third finger link so that the second finger link pivots relative to the first finger link and the third finger link pivots relative to the second finger link.

Advantageous Effects of the Invention

According to the present invention, (1) for example, when the second actuator is driven in a state where the first actuator is halted, a finger tip (the second finger link and the third finger link) alone can be bent without bending the base (the first finger link) of the finger. Further, (2) for example, when the first actuator and the second actuator are concurrently driven at substantially the same speed, the base (the first finger link) alone can be bent without bending the finger tip (the second finger link and the third finger link). In this case, torque that corresponds to two actuators acts on the finger. Further, (3) for example, when the first actuator and the second actuator are concurrently driven, with the speed of the second actuator being higher than that of the first actuator, the base (the first finger link) of the finger as well as the finger tip (the second finger link and the third finger link) can be bent. This enables an action with which an object is gripped and the gripped object is manipulated in the same way a human hand does.

DESCRIPTION OF EMBODIMENTS

Figure 1:
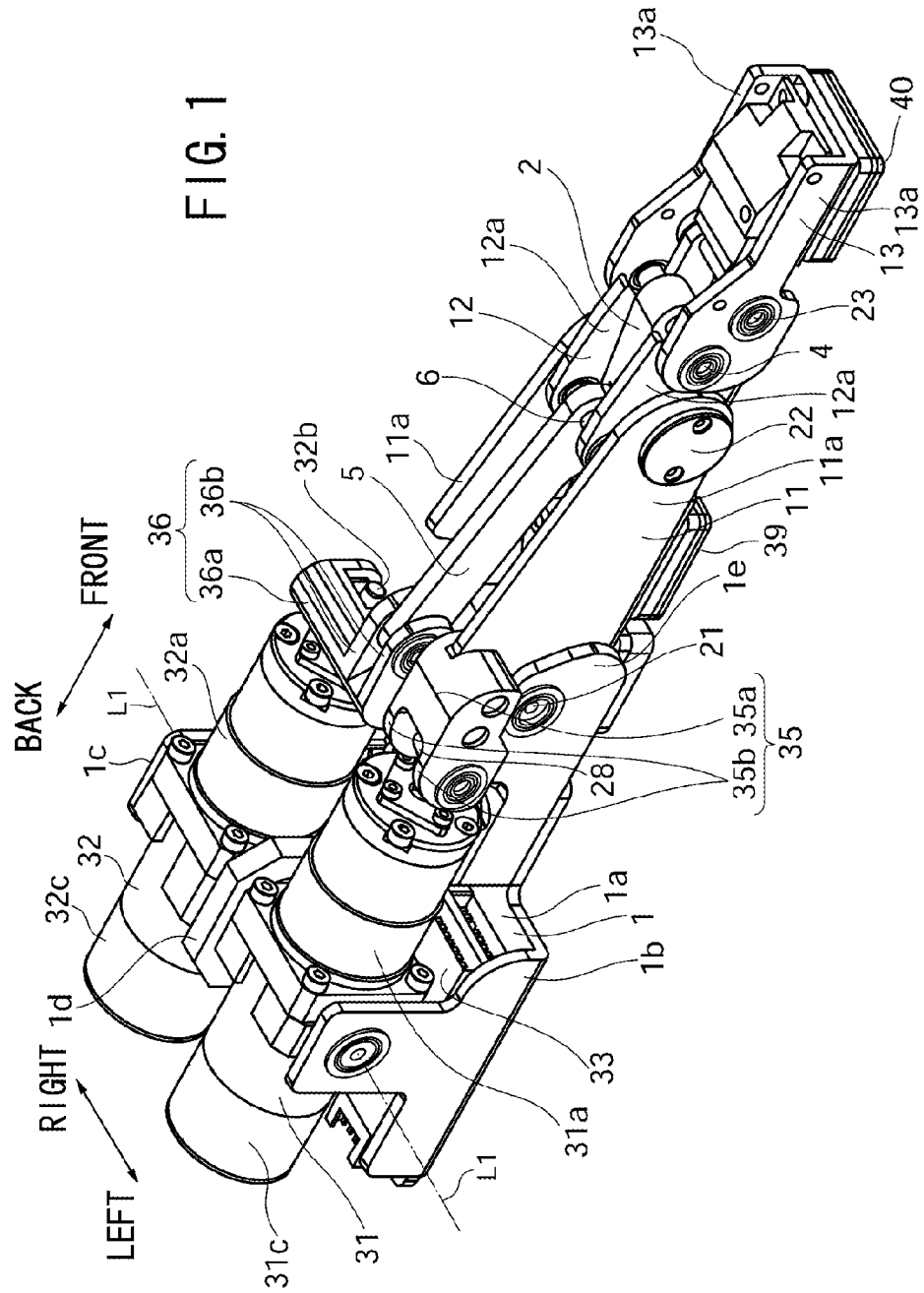
FIG. 1 is a perspective view illustrating a state where a finger of a robot hand is extended according to an embodiment of the present invention.
Figure 2:
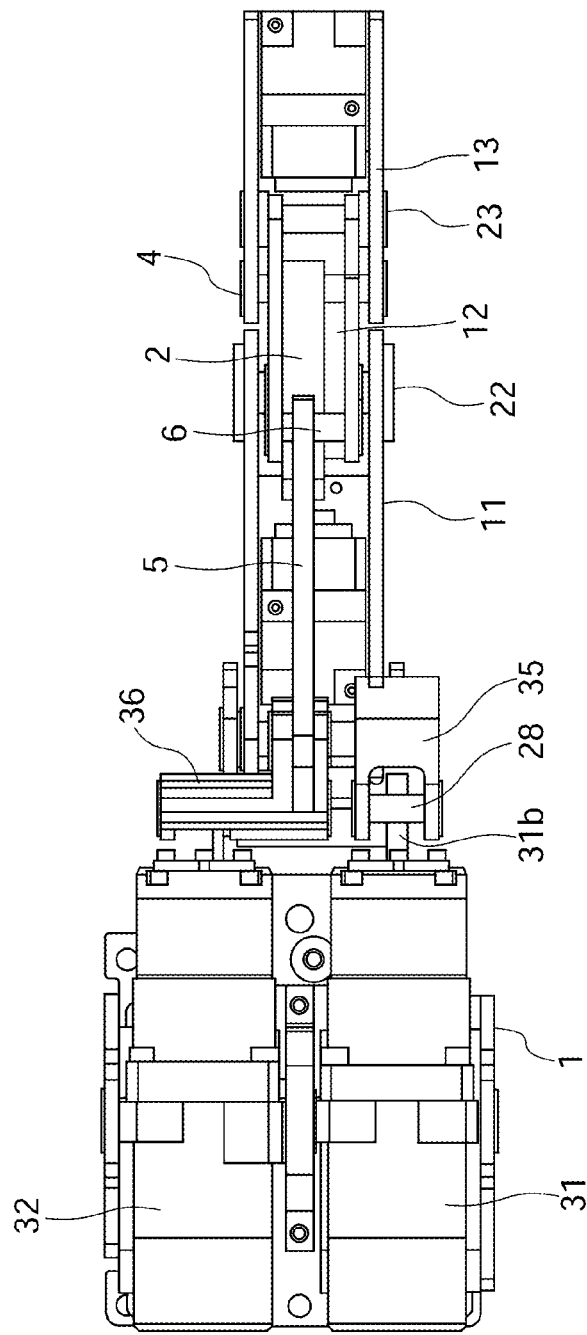
FIG. 2 is a plan view of a robot hand according to an embodiment of the present invention.
Figure 3:
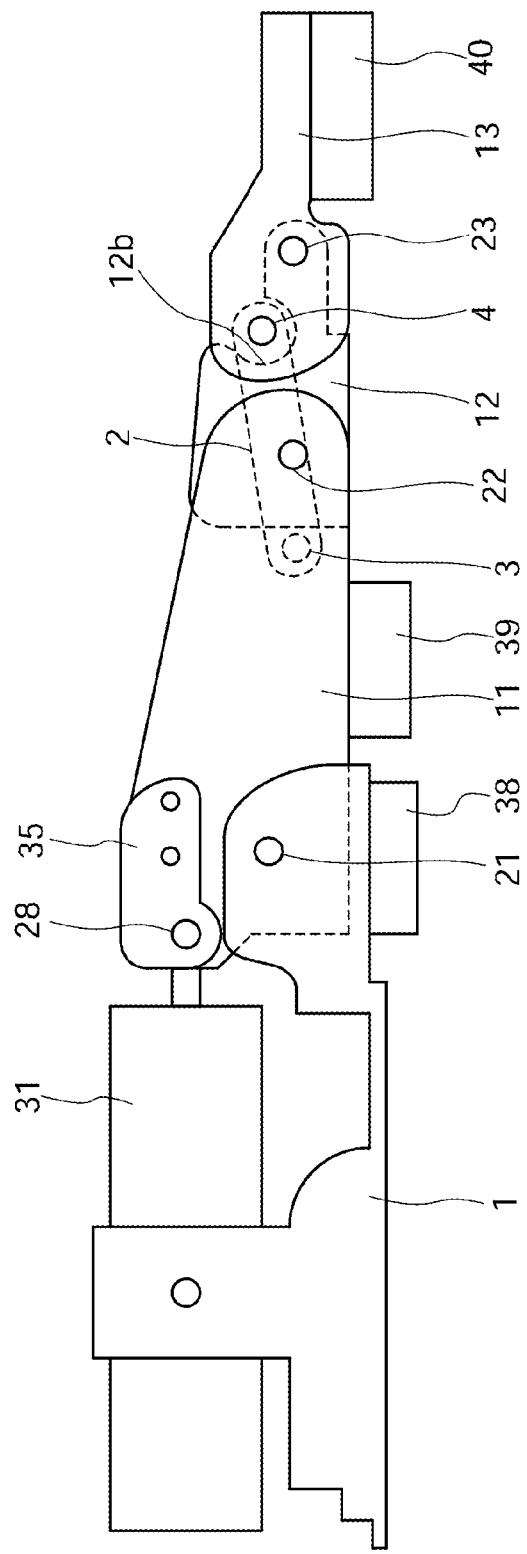
FIG. 3 is a side view of a robot hand according to an embodiment of the present invention.
Figure 4:
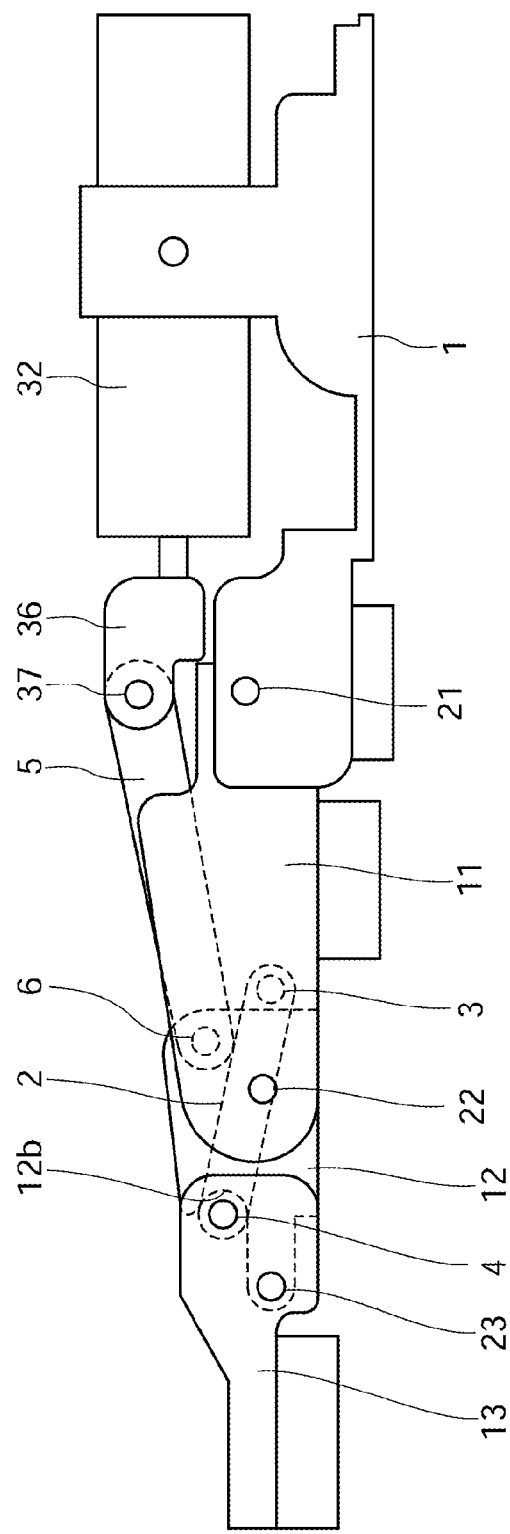
FIG. 4 is a side view of a robot hand according to an embodiment of the present invention.

With reference to the accompanying drawings, hereinafter is described a robot hand according to an embodiment of the present invention. FIG. 1 is a perspective view illustrating a state where a finger of the robot hand of the present embodiment is extended. FIG. 2 shows a plan view of the robot hand, while FIGS. 3 and 4 show side views of the robot hand. The robot hand of the embodiment has three joints corresponding to those of a human finger and is capable of skillful and delicate manipulation of an object. Typically, the robot hand is used being combined with other fingers to configure an articulated multi-fingered hand.

First, a whole configuration of the robot hand is described. The robot hand is provided with a base section 1 corresponding to the back of a human hand, a first finger link 11 corresponding to a proximal phalange of a finger, a second finger link 12 corresponding to an intermediate phalange of a finger, and a third finger link 13 corresponding to a distal phalange of a finger. The first finger link 11 has a proximal portion which is pivotably connected to the base section 1 via a first shaft 21. The second finger link 12 has a proximal portion which is pivotably connected to a distal portion of the first finger link 11 via a second shaft 22. The third finger link 13 has a proximal portion which is pivotably connected to a distal portion of the second finger link 12 via a third shaft 23. The first to third shafts 21, 22 and 23 correspond to a metacarpal interphalangeal joint, a proximal interphalangeal joint and a distal interphalangeal joint, respectively, of a human finger. The first to third shafts 21, 22 and 23 are parallel to each other.

An auxiliary link 2 has an end portion which is pivotably connected to the first finger link 11 via a connecting shaft 3, and the other end portion which is pivotably connected to the third finger link 13 via a connecting shaft 4 (see FIGS. 3 and 4). The auxiliary link 2 has a role of interlocking the pivoting of the second finger link 12 relative to the first finger link 11 with the pivoting of the third finger link 13 relative to the second finger link 12. The first finger link 11, the second finger link 12, the third finger link 13 and the auxiliary link 2 configure a four-joint pivot chain in which the four links are all chained by turning pairs. Assuming that the first finger link 11 is fixed, the third finger link 13 is allowed only a certain restricted motion.

As shown in FIG. 1, a first actuator imparts driving force to the first finger link 11 so that the first finger link 11 pivots relative to the base section 1. The first actuator is a first linear actuator 31 having a body 31a and a shaft 31b (see FIG. 2) that linearly moves relative to the body 31a. The body 31a of the first linear actuator 31 is pivotably supported by the base section 1 about a center line L1. The shaft 31b of the first linear actuator 31 is pivotably connected to the first finger link 11 so that driving force can be imparted to the first finger link 11. When the first linear actuator 31 imparts driving force to the first finger link 11, the first finger link 11 pivots relative to the base section 1. With the pivoting of the first finger link 11 relative to the base section 1, the body 31a of the first linear actuator 31 pivots about the center line L1 relative to the base section 1.

A second actuator imparts driving force to the second finger link 12 so that the second finger link 12 pivots relative to the first finger link 11. The second actuator is a second linear actuator 32 having a body 32a and a shaft 32b that linearly moves relative to the body 32a. The first linear actuator 31 has the same size as that of the second linear actuator 32. The body 32a of the second linear actuator 32 is pivotably supported by the base section 1 about the center line L1. The shaft 32b of the second linear actuator 32 is pivotably connected to a proximal portion of a working link 5. The working link 5 has a distal portion which is pivotably connected to the second finger link 12. When the second linear actuator 32 imparts driving force to the second finger link 12, the second finger link 12 pivots relative to the first finger link 11. Interlocking with this, the third finger link 13 pivots relative to the second finger link 12. Further, the body 32a of the second linear actuator 32 pivots about the center line L1 relative to the base section 1.

FIGS. 5(A) to 5(F) show motion diagrams of the robot hand. According to the robot hand configured as described above, (1) for example, when the second linear actuator 32 is driven in a state where the first linear actuator 31 is halted, the finger tip (the second finger link 12 and the third finger link 13) alone can be bent without bending the base (the first finger link 11) of the finger (FIG. 5(C) to FIG. 5(B) to FIG. 5(A)). In other words, with the first finger link 11 retaining an angle relative to the base section 1, the second finger link 12 can be pivoted relative to the first finger link 11, and the third finger link 13 can be pivoted relative to the second finger link 12.

Figure 5A:
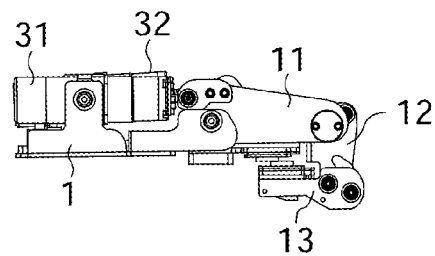
FIGS. 5(A) to 5(F) show motion diagrams of a robot hand according to the present embodiment.
Figure 5B:
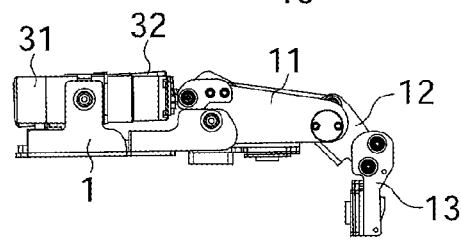
Figure 5C:
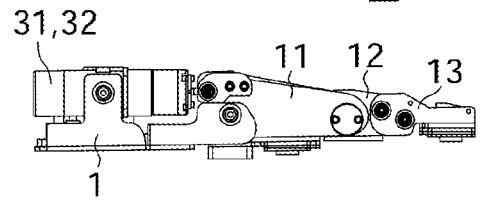
Figure 5D:
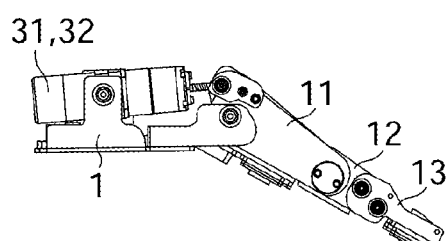
Figure 5E:
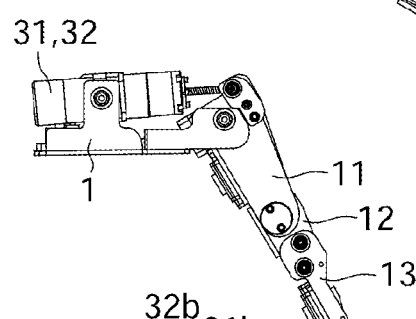
Figure 5F:
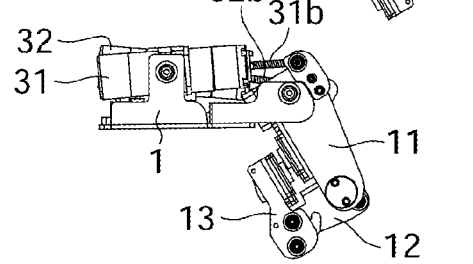

Further, (2) for example, when the first linear actuator 31 and the second linear actuator 32 are concurrently driven at substantially the same speed, the base (the first finger link 11) alone can be bent without bending the fingertip (the second finger link 12 and the third finger link 13) (FIG. 5(C) to FIG. 5(D) to FIG. 5 (E)). In this case, the finger can be applied with torque that is a sum of the torque of the first and second linear actuators 31 and 32.

Further, (3) for example, when the first linear actuator 31 and the second linear actuator 32 are concurrently driven, with the speed of the second linear actuator 32 being higher than that of the first linear actuator 31, the base (the first finger link 11) of the finger as well as the finger tip (the second finger link 12 and the third finger link 13) can be bent (FIG. 5(C) to FIG. 5(F)).

Hereinafter is described a structure of each of parts of the robot hand. As shown in FIG. 1, in the following description, a direction in which the extended finger extends is a front-back direction, and a direction perpendicular to the extended finger is a right-and-left direction.

The base section 1 includes a bottom 1a and a pair of support walls 1b and 1c vertically set up from the ends of the bottom 1a in the right-and-left direction. The pair of support walls 1b and 1c is provided therebetween with an intermediate wall 1d. The body 31a of the first linear actuator 31 is pivotably supported between the support wall 1b and the intermediate wall 1d. The body 32a of the second linear actuator 32 is pivotably supported between the intermediate wall 1d and the support wall 1c. The center line L1 for the pivoting of the first linear actuator 31 relative to the base section 1 is in alignment with the center line L1 for the pivoting of the second linear actuator 32 relative to the base section 1.

Using ball screws, the first and second linear actuators 31 and 32 allow the respective shafts to linearly move relative to the respective bodies. The shafts 31b and 32b have respective outer peripheral surfaces in which threads are formed. The bodies 31a and 32a are incorporated with ball screw nuts to be threadably engaged with the threads of the respective shafts 31b and 32b. The bodies 31a and 32a are mounted with motors 31c and 32c, respectively, for rotating and driving the ball screw nuts. When the ball screw nuts are rotated and driven by the motors 31c and 32c, the shafts 31b and 32b are linearly moved in an axial direction.

The base section 1 is arranged with a first driver 33 and a second driver that supply electric power suitable for controlling the motors of the first linear actuator 31 and the second linear actuator 32 (FIG. 1 only shows the first driver 33, but the second driver is arranged below the second linear actuator 32). The first driver 33 and the second driver are each provided with a power converter, such as a PWM (pulse width modulation) inverter, that supplies electric power to the motor, and a controller that controls the power converter on the basis of the information from a higher-order command device, such as an operational manipulator, and sensors described later. The first driver 33 and the second driver carry out synchronous control with either of the first and second linear actuators 31 and 32 as being a main axis and the other as being a driven axis.

The shaft 31b of the first linear actuator 31 is pivotably connected to the first finger link 11 via a first adaptor 35. The first adaptor 35 includes a body 35a fixed to the first finger link 11, and a pair of shaft supports 35b diverged into two from the body 35a. The pair of shaft supports 35b rotatably supports a connecting shaft 28. The connecting shaft 28 is connected with the shaft 31b (see FIG. 2) of the first linear actuator 31.

The shaft 32b of the second linear actuator 32 is pivotably connected to the working link 5 via a second adaptor 36. The second adaptor 36 includes a body 36a connected to the shaft 32b of the second linear actuator 32, and a pair of connecting sections 36b projected forward from the ends of the body 36a in the right-and-left direction, being diverged into two. The pair of connecting sections 36b is provided with a connecting shaft 37. The connecting shaft 37 is rotatably connected with a proximal portion of the working link 5.

The base section 1 has a front end which has a U-shaped cross section. The front end of the base section 1 includes a pair of support walls 1e across which a first shaft 21 is bridged to pivotably support the first finger link 11. The base section 1 is mounted with a sensor 38 (see FIG. 3). The sensor 38 is configured, for example, by a six-axis force sensor which concurrently detects force and torque in X, Y and Z directions in real time.

As shown in FIG. 1, the first finger link 11 has a U-shaped cross section. The first finger link 11 includes a bottom and a pair of side walls 11a vertically set up from the ends of the bottom in the right-and-left direction. The pair of side walls 11a of the first finger link 11 is fitted between the pair of support walls 1e in the distal portion of the base section 1. The pair of side walls 11a of the first finger link 11 has distal portions which are provided with the second shaft 22. The second finger link 12 is pivotably supported by the second shaft 22 (see FIG. 3). The first finger link 11 is mounted with a sensor 39 (see FIG. 3) configured, for example, by a six-axis force sensor.

The second finger link 12 has a U-shaped cross section. The second finger link 12 includes a bottom and a pair of side walls 12a vertically set up from the ends of the bottom in the right-and-left direction. The pair of side walls 12a of the second finger link 12 is fitted between the pair of side walls 11a of the first finger link 11. The pair of side walls 12a of the second finger link 12 has distal portions which are provided with the third shaft 23. The third finger link 13 is pivotably supported by the third shaft 23. The pair of side walls 12a of the second finger link 12 has proximal portions which are provided with a connecting shaft 6. The connecting shaft 6 is connected to a distal portion of the working link 5 (see FIG. 4). The pair of side walls 12a is formed with respective cuts 12b so as to avoid interference with the connecting shaft 4 (see FIG. 4).

The third finger link 13 has a U-shaped cross section. The third finger link 13 includes a bottom and a pair of side walls 13a vertically set up from the ends of the bottom in the right-and-left direction. The pair of side walls 12a of the second finger link 11 is fitted inside the pair of side walls 13a of the third finger link 13. The pair of side walls 13a of the third finger link 13 has proximal portions which are provided with the connecting shaft 4. The auxiliary link 2 is pivotably connected to the connecting shaft 4. The third finger link 13 is mounted with a sensor 40 (see FIG. 3) configured, for example, by a six-axis force sensor.

The working link 5 is formed into a plate shape which is elongated in the front-back direction. The working link 5 has a proximal portion which is pivotably connected to the connecting shaft 37 of the adaptor 36. The distal portion of the working link 5 is pivotably connected to the connecting shaft 6 of the second finger link 12.

The auxiliary link 2 is formed into a plate shape which is elongated in the front-back direction. The auxiliary link 2 has a proximal portion which is pivotably connected to the connecting shaft 3 (see FIG. 3) of the first finger link 11. The auxiliary link 2 has a distal portion which is connected to the connecting shaft 4 (see FIG. 3) of the third finger link 13.

The configuration of the robot hand of the present embodiment has so far been described. The robot hand of the present embodiment has advantageous effects as follows. The bodies 31a and 32a of the first linear actuator 31 and the second linear actuator 32, respectively, for moving the finger are arranged at the base section 1. Accordingly, being imparted with a force (joint torque) of intensity similar to that of a human finger, the size of the finger can be reduced to a size equivalent to that of a human finger. Further, when the first to third finger links 11, 12 and 13 collide with an object or are immersed in water, the first and second linear actuators 31 and 32 can be protected.

The center line L1 for the pivoting of the first linear actuator 31 relative to the base section 1 is arranged in alignment with the center line L1 for the pivoting of the second linear actuator 32 relative to the base section 1. This facilitates the control of the first and second linear actuators 31 and 32.

The second linear actuator 32 imparts driving force to the second finger link 12 via the working link 5. Accordingly, the second linear actuator 32 can be arranged at the base section 1 which is distanced from the second finger link 12.

The auxiliary link 2 is pivotably connected to the first finger link 11 and the third finger link 13 to enable interlinkage of the pivoting of the first finger link 11 with the pivoting of the third finger link 13.

The present invention is not limited to the foregoing embodiment, but may be modified into various embodiments as follows within a scope not changing the spirit of the present invention.

In the foregoing embodiment, the finger of the robot hand has three joints. However, the finger of the robot hand may have four joints. In this case, a fourth finger link is pivotably connected to a distal portion of the third finger link. Then, a second auxiliary link is pivotably connected to the second finger link and the fourth finger link so that the pivoting of the third link relative to the second link is interlocked with the pivoting of the fourth link relative to the third finger link.

In the foregoing embodiment, the first to third finger links 11, 12 and 13 and the auxiliary link 2 are chained by turning pairs to configure a four-joint pivot chain. However, at least one of the four turning pairs may be replaced by a sliding pair.

In the foregoing embodiment, driving force is imparted from the second linear actuator 32 to the second finger link 12 via the working link 5. However, driving force may be directly imparted from the second linear actuator to the second finger link. Alternatively, driving force may be imparted from the second linear actuator to the auxiliary link via the working link. Alternatively, driving force may be imparted from the second linear actuator to the third finger link via the working link.

Figure 6:
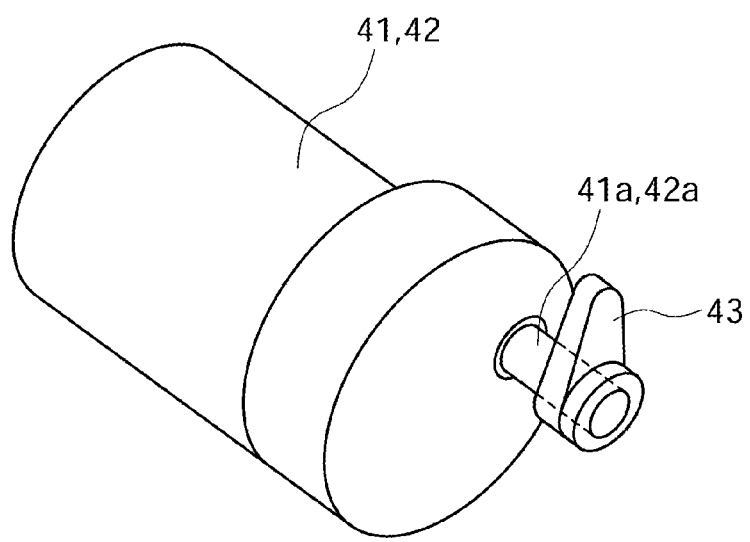
FIG. 6 shows another example of first and second actuators of a robot hand according to the present embodiment.

In the foregoing embodiment, the first and second linear actuators 31 and 32 provided to the base section 1 are used as a driving source for moving the finger. However, first and second rotary motors 41 and 42 having respective speed reducers as shown in FIG. 6 may be used, being provided to the base section 1. In this case, the first and second rotary motors 41 and 42 having speed reducers include output shafts 41a and 42a which are provided with a lever 43 being fixed thereto. The first rotary motor 41 having a speed reducer pivots the first finger link 11 via the lever 43. The second rotary motor 42 having a speed reducer pivots the second finger link 12 via the lever 43.

In the foregoing embodiment, the first and second linear actuators 31 and 32 provided to the base section 1 are used as a driving source for moving the finger. However, a first rotary motor may be provided at a position corresponding to the metacarpal interphalangeal joint of a human hand so that the first link is ensured to pivot relative to the base section. Alternatively, a second rotary motor may be provided at a position corresponding to the proximal interphalangeal joint of a human hand so that the second link is ensured to pivot relative to the first link.

The foregoing embodiment uses the first and second linear actuators 31 and 32 which use ball screws. However, instead of the first and second linear actuators 31 and 32 using ball screws, pneumatic or hydraulic cylinders, linear motors, artificial muscle actuators, or the like may be used.

In the foregoing embodiment, the first to third shafts 21, 22 and 23, as well as the connecting shafts 3 and 4, are fitted to respective bores that match the diameters of the shafts. However, the shafts may be fitted to respective long holes. In this case, there is a need of providing springs that urge the first to third shafts 21, 22 and 23, as well as the connecting shafts 3 and 4, to ends of respective long holes in a longitudinal direction so that the first to third finger links 11, 12 and 13 are enabled with only a restricted movement.

INDUSTRIAL APPLICABILITY

The robot hand of the present invention can be used as an end effector of a robot, such as a humanoid robot or an industrial robot. Besides, the robot hand of the present invention can be used as an artificial hand that can serve in place of a human hand.

The present specification is based on Japanese Patent Application No. 2012-250491 filed on Nov. 14, 2012. All the contents of the application are incorporated herein.

REFERENCE SIGNS LIST

1 . . . Base section, 2 . . . Auxiliary link, 5 . . . Working link, 11 . . . First finger link, 12 . . . Second finger link, 13 . . . Third finger link, 21 . . . First shaft, 22 . . . Second shaft, 23 . . . Third shaft, 31 . . . First linear actuator (First actuator), 31a . . . Body of first linear actuator, 31b . . . Shaft of first linear actuator, 32 . . . Second linear actuator (Second actuator), 32a . . . Body of second linear actuator, 32b . . . Shaft of second linear actuator, L1 . . . Center line

The invention claimed is:
1. A robot hand, comprising:
a base section;
a first finger link pivotably connected to the base section;
a second finger link pivotably connected to the first finger link;
a third finger link pivotably connected to the second finger link;
an auxiliary link that interlocks pivoting of the second finger link relative to the first finger link with pivoting of the third finger link relative to the second finger link;
a first actuator that imparts driving force to the first finger link so that the first finger link pivots relative to the base section; and
a second actuator that imparts driving force to at least one of the second finger link and the third finger link so that the second finger link pivots relative to the first finger link and the third finger link pivots relative to the second finger link,
wherein the first actuator and the second actuator are arranged at the base section,
the first actuator is a first linear actuator having a body and a shaft that linearly moves relative to the body,
the second actuator is a second linear actuator having a body and a shaft that linearly moves relative to the body, and
the body of the first linear actuator and the body of the second linear actuator are arranged at the base section.
2. The robot hand according to claim 1, wherein
the body of the first linear actuator is pivotably supported by the base section,
the body of the second linear actuator is pivotably supported by the base section, and
a center line for pivoting of the first linear actuator relative to the base section is substantially in alignment with a center line for pivoting of the second linear actuator relative to the base section.
3. The robot hand according to claim 2, wherein
the robot hand further comprises a working link pivotably connected to the shaft of the second linear actuator while being pivotably connected to the second finger link or the auxiliary link, and
the second linear actuator imparts driving force to the second finger link via the working link.
4. The robot hand according to claim 3, wherein the auxiliary link is only pivotably connected to the first finger link while being only pivotably connected to the third finger link.
5. The robot hand according to claim 2, wherein the auxiliary link is only pivotably connected to the first finger link while being only pivotably connected to the third finger link.
6. The robot hand according to claim 1, wherein
the robot hand further comprises a working link pivotably connected to the shaft of the second linear actuator while being pivotably connected to the second finger link or the auxiliary link, and
the second linear actuator imparts driving force to the second finger link via the working link.
7. The robot hand according to claim 6, wherein the auxiliary link is only pivotably connected to the first finger link while being only pivotably connected to the third finger link.

8. The robot hand according to claim 1, wherein the auxiliary link is only pivotably connected to the first finger link while being only pivotably connected to the third finger link.

* * * * *